Dec. 11, 1928.
C. A. PILANT
1,695,156
SEPARATOR
Filed Feb. 11, 1928
2 Sheets-Sheet 1
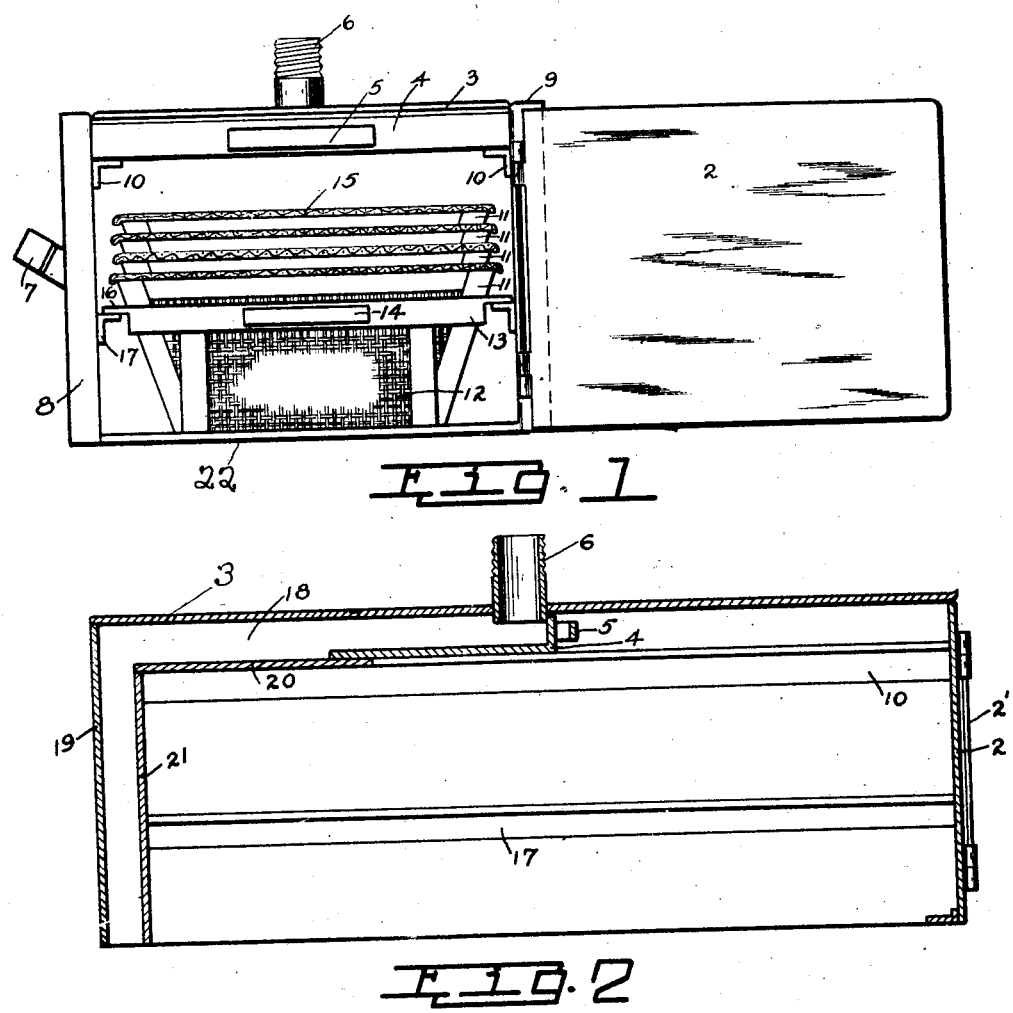
Inventor
C. A. PILANT
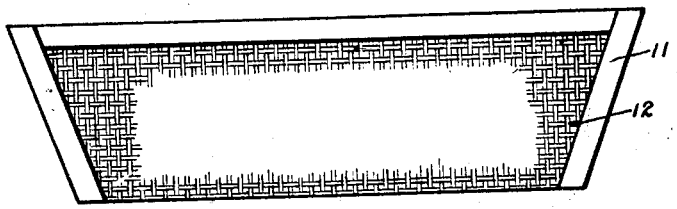
Attorneys Dec. 11, 1928.

C. A. PILANT 1,695,156

SEPARATOR

Filed Feb. 11, 1928

Inventor

C. A. PILANT

By James J. Sheehy & Co.

Attorney

Patented Dec. 11, 1928.

1,695,156

UNITED STATES PATENT OFFICE.

CHARLES ALONZO PILANT, OF NEW ORLEANS, LOUISIANA.

SEPARATOR.

Application filed February 11, 1928. Serial No. 253,713.

My present invention pertains to separators, and it contemplates the provision of a simple and inexpensive device which is adapted to positively and economically separate the oil that is present in the feed water to boilers; it being well known that in condensing engines there is more or less oil getting into the water due to the swabbing of piston rods and lubricating the cylinders.

The device is particularly adapted for use in connection with the feed water to the boiler of a ship and this for the reason that the water being condensed steam that has been through the engine, a large amount of oil will go into the boiler, over and over, as the feed water is used in a continuous circuit, and it is therefore necessary to extract the oil from the water to eliminate injury to the boiler caused by the oil.

Other objects of the invention will be fully understood from the following description and claims when the same are read in connection with the drawings accompanying and forming part of this specification, in which:

Figure 1 is a front elevation of my novel gravity flow oil separator looking into the separator and showing the novel arrangement of the separating means.

Figure 2 is a longitudinal sectional view of the casing of the separator with the separator means removed therefrom.

Figure 3 is a detail view of one of the baskets comprising the separating means.

Similar numerals of reference designate corresponding parts in all the views of the drawings.

Figure 4:
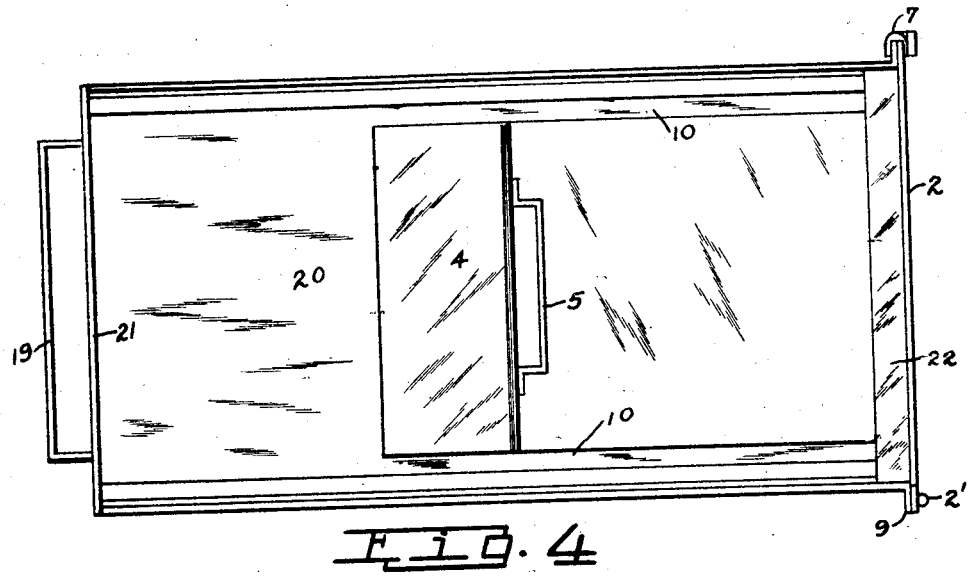
Figure 4 is an inverted plan view of the separator casing and showing how the same appears with the basket removed.
Figure 5:
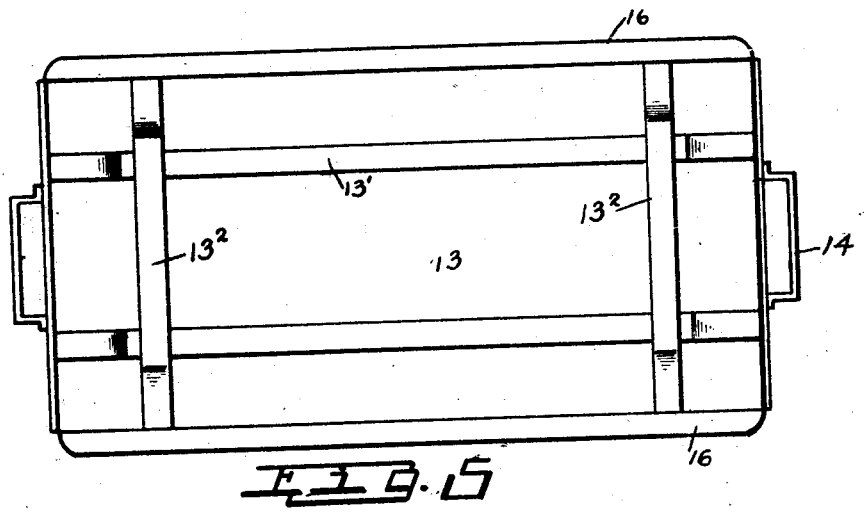
Figure 5 is a top plan view illustrating my novel basket holding device.

My novel device comprises a casing that is provided with a door 2 and the said door is hinged by means of pintles 2' that are secured on the flanged edge 9 of the casing and provided on the opposite end of the casing and on the wall 8 thereof is a keeper 7. It will be seen that the wall 8 extends inwardly and acts as a bearing surface for the door while at its upper end the wall 8 connects with the top wall 3 of the casing and in said casing I provide the threaded nipple 6 for a purpose hereinafter set forth.

Adapted to slide along the upper track 10 of the casing is a shutter or tray 4 having the handle 5.

Constructed so as to slide on the track 17 of the casing is an open basket 13 comprising the longitudinal struts 13' and the transverse struts 13''. This basket is further provided with the longitudinal flanged edges 16 that engage the track 17 and is further provided with a handle 14. As clearly shown in Figure 2 I provide the basket 11 and the said basket has screened bottom, sides and ends and in the practical use of the device the basket is duplicated in a series; preferably four in number, and are so arranged that they nest one within the other and are held in proper position in the casing by means of the basket 13. Interposed between each of the baskets is a fibre cloth or filtering or separating element 15. This element 15 is laid in each one of the baskets and the superimposed basket is laid on the cloth whereby a separator element is interposed between each of the baskets and the said element completely covers the screened portion 12 of each basket. Manifestly removal of the basket 13 will be attended with removal of the basket 11 from the casing.

Interposed below the wall 3 of the casing is an angular wall 20 that terminates in a wall 21 and the wall 3 is secured to the wall 19 thereby producing a space 18. The purpose of this is to permit the water from the boiler to pass through the device during the cleaning operation hereinafter specified.

As clearly shown in Figure 4 it will be seen that the baffle or tray 4 is adapted to rest immediately under the nipple 6 and shunt the water onto the wall 20 when occasion demands. The device is entirely open at its lower end with the exception of a cross strut or brace 22 that like the wall 8 acts as a bearing for the door 2.

In the practical use of the invention, the separator is attached to the air pump discharge at present in use and by means of the nipple 6, so that the water and oil will be discharged into the separator and as there is no pressure on the separator the water and oil combined is caught in the cloths 15. The oil will be retained in the cloths 15 while the water will drop through the basket for return to the feed line of the boiler. The cloths 15 can be changed by merely pushing the shutter or tray 4 to the position shown in Figure 2 so that the water entering the separator will pass along the space 18 to the feed line. Then by merely pulling the basket 13 out of the casing the baskets 11 may be removed therefrom and the cloths 15 that are saturated with oil removed from the baskets and replaced with fresh cloths. The baskets 11 are then placed in the basket 13 and the entire device immediately returned to the casing. The shutter or tray 4 is then pulled forward so that the water from the pumps will pass through the baskets.

It will be manifest that the manner of changing the cloth will not take over five minutes and that during the changing operation only a very small amount of water will pass to the boilers.

It is also to be seen that the device is extremely inexpensive and consists of no elements that are liable to become inoperative after a short period of use.

What I claim is:—

1. A separator comprising a casing, an inlet arranged on the casing, tracks formed in the casing, a baffle arranged on one of the tracks and slidable thereon, a retaining basket slidable on one of the tracks, baskets having foraminous surfaces adapted to nest in each other and in the first basket, cloths adapted to be interposed between the foraminous baskets and a door arranged on the casing.

2. A separator for the purpose set forth comprising a casing, tracks formed in the casing, a wall of angular form formed below the upper wall and one of the end walls of the casing whereby a space is produced in the casing, a baffle slidably arranged on one of the tracks, and filtering means mounted on one of the tracks and arranged below the baffle.

3. A separator comprising a casing and a separating means removably arranged in the casing and comprising a basket having longitudinal and transverse members and further comprising a series of foraminous nesting baskets adapted to be held in the first basket and a filtering agent interposed between each of the foraminous baskets.

4. A separator comprising a casing, an inlet formed in the casing, a baffle slidably arranged in the casing and a wall adapted to communicate with the baffle and filtering means slidably arranged within the casing; said casing being open at its lower end and having a door on one of its walls.

In testimony whereof I have hereunto set my hand.

CHARLES ALONZO PILANT.